United States Patent [19]

Dezael et al.

[11] 4,163,043

[45] Jul. 31, 1979

[54] PROCESS FOR REMOVING H$_2$S AND CO$_2$ FROM GASES AND REGENERATING THE ADSORBING SOLUTION

[75] Inventors: Claude Dezael, Maisons Laffitte; André Deschamps, Noisy le Roi; Sigismond Franckowiak, Rueil Malmaison, all of France

[73] Assignee: Institut Francais du Petrole, Rueil-Malmaison, France

[21] Appl. No.: 889,803

[22] Filed: Mar. 24, 1978

[30] Foreign Application Priority Data

Mar. 25, 1977 [FR] France .................................. 77 09255

[51] Int. Cl.$^2$ ............................................ B01D 53/34
[52] U.S. Cl. ..................................... 423/234; 423/42; 423/183; 423/356; 423/642; 423/543
[58] Field of Search ............... 423/183, 234, 356, 642, 423/42, 543

[56] References Cited

U.S. PATENT DOCUMENTS

| 2,031,844 | 2/1936 | Moore | 423/642 |
|---|---|---|---|
| 2,056,929 | 10/1936 | Moore | 423/642 |
| 2,106,734 | 2/1938 | Gallmar | 423/234 |
| 2,164,141 | 6/1939 | Moore | 423/642 |
| 2,184,923 | 12/1939 | Holtmeier | 423/356 |
| 2,439,404 | 4/1948 | Wicker | 423/642 |
| 2,487,577 | 11/1949 | Stanley | 423/234 |
| 2,878,099 | 3/1959 | Breuing et al. | 423/234 |
| 3,846,538 | 11/1974 | Renault et al. | 423/234 |
| 4,038,366 | 7/1977 | Fukuda et al. | 423/234 |

*Primary Examiner*—Herbert T. Carter
*Attorney, Agent, or Firm*—Millen & White

[57] ABSTRACT

H$_2$S and CO$_2$ from a waste gas are absorbed in an ammoniacal or alkali metal hydroxide solution. The resultant sodium, potassium or ammonium sulfide solution is reacted with pulverized copper oxide and the resultant copper sulfide precipitate is separated and the resultant solution of increased sodium hydroxide, potassium hydroxide or ammonia content is recycled as absorbent for hydrogen sulfide and CO$_2$. The copper sulfide is roasted to form recyclable copper oxide and product sulfur dioxide.

10 Claims, 2 Drawing Figures

PROCESS FOR REMOVING H₂S AND CO₂ FROM GASES AND REGENERATING THE ADSORBING SOLUTION

The removal of hydrogen sulfide from a gas is usually effected by washing with an aqueous solution of a basic compound. Ammonia solutions may be used or, more often, solutions of strong bases such as sodium hydroxide or potassium hydroxide or of their carbonates, and this is a very efficient means to recover hydrogen sulfide.

Waste-gas from natural gas treatment plants or certain industrial gases from refineries or from the chemical industry may thus be purified.

The resulting solutions, particularly the solutions containing strong base sulfides, cannot be regenerated easily; however their direct discharge would result in a strong pollution of the waters.

When these gases contain carbon dioxide in addition to hydrogen sulfide, and there is used a process which is not selective with respect to hydrogen sulfide and carbon dioxide, the resulting solutions contain both carbonates and sulfides. When regenerating according to conventional vaporizing processes, by heating or stripping, both carbon dioxide and hydrogen sulfide evolve and must be separated later for most of their uses. Such an operation is expensive.

The object of the invention is to propose an improved process for treating aqueous ammonium, sodium and/or potassium sulfide solutions, while recovering practically all constituents therefrom as sulfur dioxide or sulfur and corresponding alkaline solutions which can be re-utilized as H₂S absorption agent.

The process comprises contacting the aqueous ammonium, sodium and/or potassium sulfide solution with pulverized copper oxide, so as to obtain (a) a copper sulfide precipitate which is separated and then oxidized at high temperature to copper oxide for re-use, and (b) an aqueous solution of increased ammonia, sodium hydroxide or potassium hydroxide content.

It has been observed that, when the solutions to be treated contain both said sulfides and the corresponding carbonates, the latter are still present, after the treatment, in the resultant solution (b). Under the conditions of the invention, the precipitate consists essentially of copper sulfide. This is an advantage of the process. As a matter of fact, the effluent gas formed when regenerating copper oxide by roasting of the precipitate contains a substantial proportion of sulfur dioxide or sulfur and may be used without preliminary treatment.

The contact of the aqueous sulfide solution with copper oxide—which is preferably pulverized as finely as possible so as to increase its surface of contact—may be effected in a reactor preferably provided with a stirring device, at a moderate temperature, for example in the range from 0° C. to the boiling point of the solution, usefully at the temperature at which the solution to be regenerated is available, i.e., usually at about 20°–60° C.

Copper oxide may be supplied as such, for example by air actuating means, or suspended in water, in an amount preferably in slight excess over the stoichiometrical amount. Stirring is continued for a sufficient time to obtain a satisfactory reaction yield, i.e., for about one minute to one hour depending on the case, usually about half an hour.

The following reactions take place:

$$(NH_4)_2S + CuO + H_2O \rightarrow CuS + 2NH_4OH$$

or $$Na_2S + CuO + H_2O \rightarrow CuS + 2NaOH$$

or $$K_2S + CuO + H_2O \rightarrow CuS + 2KOH$$

When using ammonia solutions, a soluble copper ammonia complex salt and such salts as Cu₂S may be formed; they are not detrimental to the performance of the invention.

A precipitate is obtained; it has usually a muddy appearance and contains resultant copper sulfide and excess copper oxide; it is separated from the aqueous phase, for example, by decantation, filtration or centrifugation.

It is advantageous to carefully remove water or rinse the resulting material with water which may be thereafter added to the filtration solution, to avoid any alkali metal hydroxide or ammonia loss and any supply of ammonia to the burner.

This material is then fed to a furnace where it is oxidized in a known manner, for example by means of air and/or steam, so as to regenerate copper oxide, which is re-utilized in the process, and to recover sulfur optionally as sulfur dioxide.

Processes for roasting copper sulfide are known. The muds are heated in furnaces at temperatures of, for example, 600°–1100° C., preferably 700°–900° C., in the presence of an excess of air or other molecular oxygen containing gas, to thereby obtain sulfur dioxide gas evolution. Copper oxide is recovered; it may be freed of copper sulfate impurities contained therein by water washing.

Copper oxide may be re-used in the process according to the invention; it is separated from the gas, for example by passage in a cyclone. Alternative embodiments exist. Copper sulfide may be first heated, in the presence of air in excess, at a temperature of from 100° to 300° C. to obtain copper sulfate which is then heated at a higher temperature, for example 700°–900° C., to release gaseous sulfur dioxide and regenerate copper oxide. Copper sulfate may also be reduced to copper metal and SO₂ by means of a reducing gas such as H₂ or CO at 350°–450° C. Copper metal is then oxidized in the presence of air at 100°–400° C. to form copper oxide.

Another method consists of roasting copper sulfide in the presence of steam and a controlled amount of air to mainly obtain sulfur.

The operation may be conducted in a movable hearth furnace in fixed or fluidized bed. The fluidized bed may consist of copper sulfide itself of any other inert carrier.

Sulfur dioxide so-produced may be used in the manufacture of sulfuric acid or in reactors of the Claus type, where it is reacted with hydrogen sulfide to yield sulfur.

The aqueous phase separated from the precipitate of copper oxide may be utilized as such, eventually after addition of the precipitate wash water, as H₂S absorption agent. However, when applying the invention to an ammonium sulfide, said aqueous phase contains both dissolved ammonia and a soluble copper ammonia complex. In that case, it is preferred to subject the aqueous phase to stripping with a stream of inert gas, for example, nitrogen or steam, or to heating at the boiling point, thereby releasing ammonia (which may be used as H₂S absorption agent) and decomposing the copper complex: the resultant copper oxide suspension may be usefully employed as aqueous phase for washing the copper sulfide precipitate; copper oxide remains on the filter, admixed with copper sulfide, without disadvantage.

The following non-limiting examples illustrate the invention wherein.

EXAMPLE 1 (FIG. 1)

Figure 1:
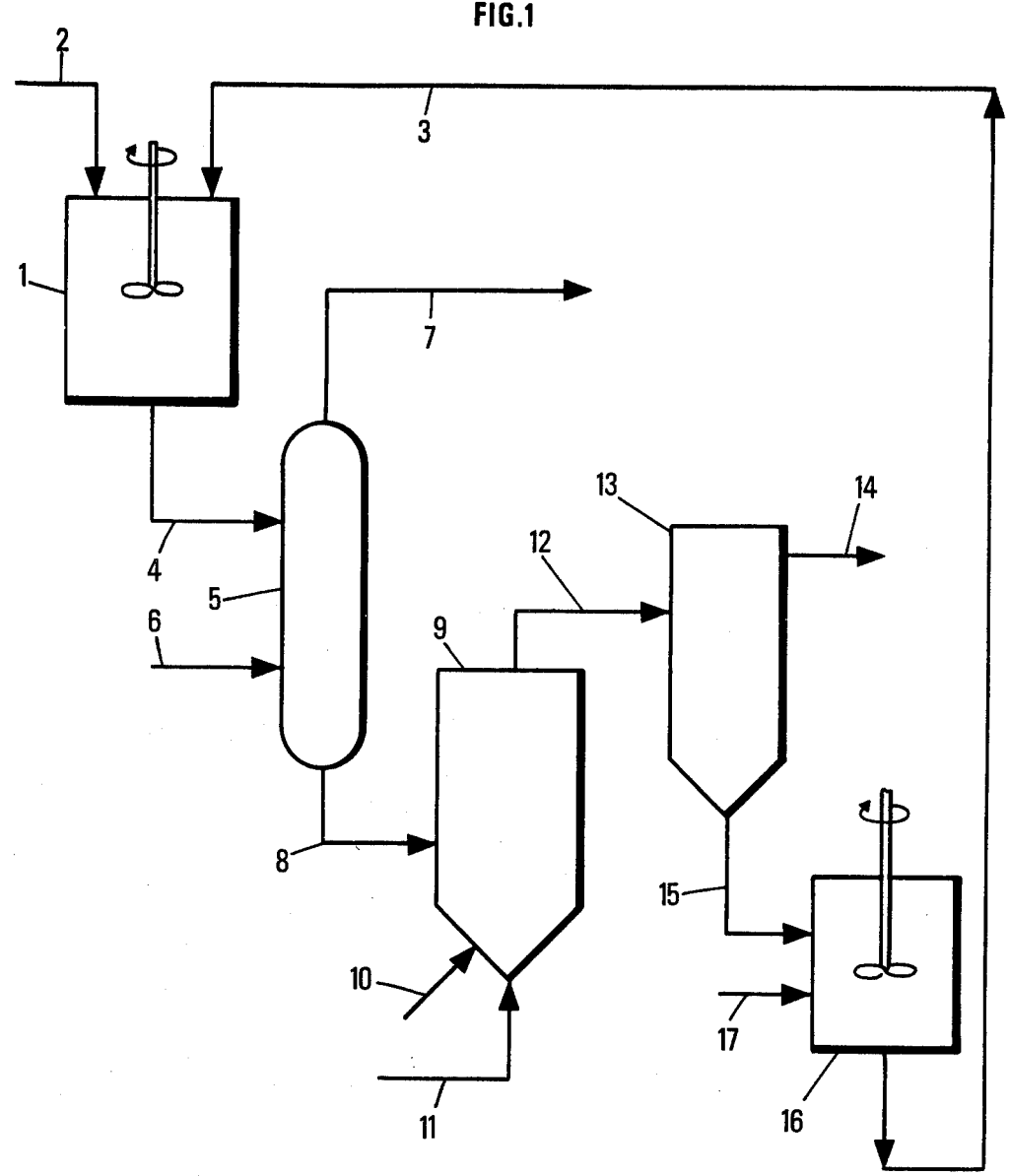
FIG. 1 is a schematic flowsheet which is described in Example 1.
Figure 2:
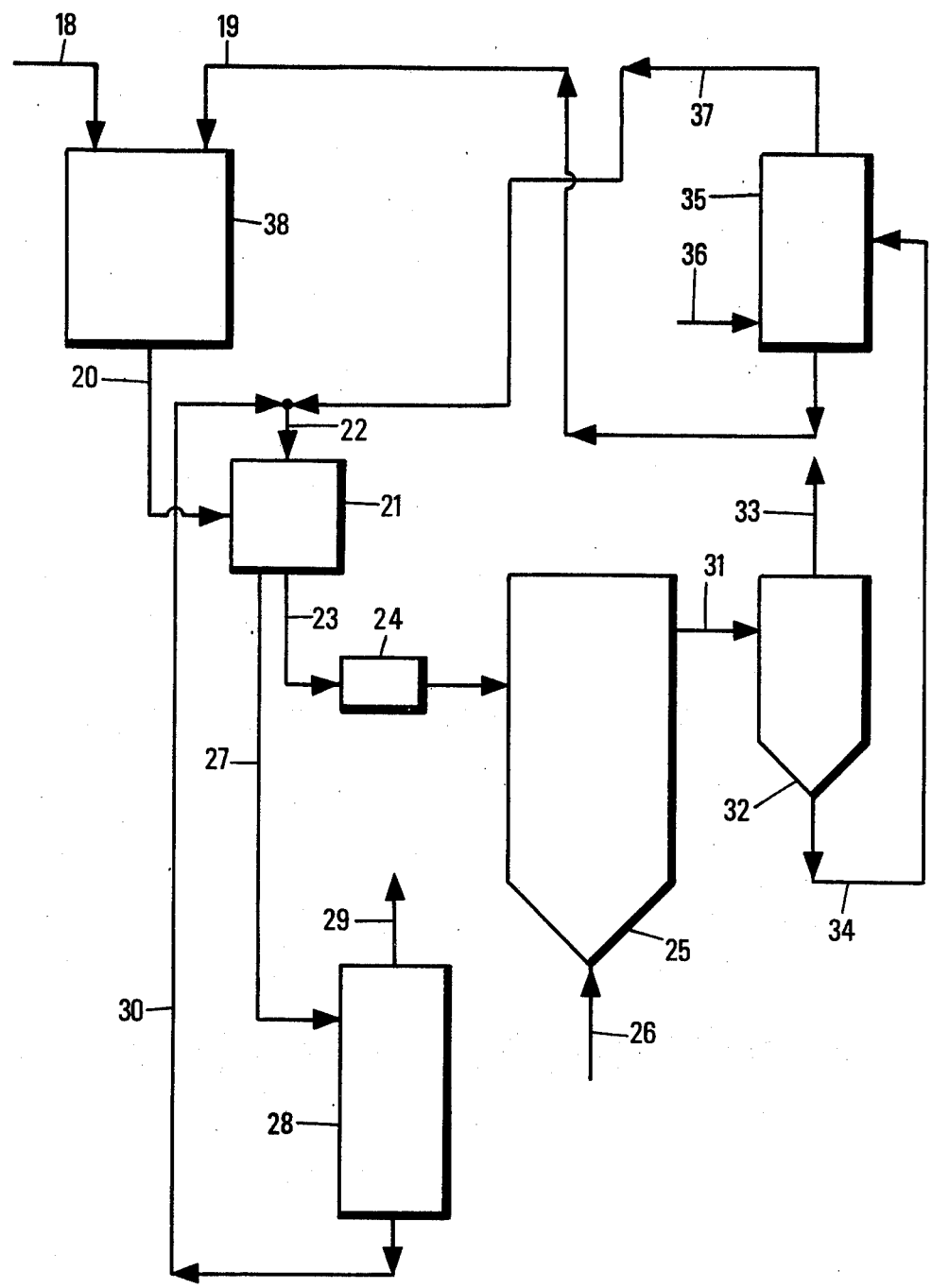
FIG. 2 is a schematic flowsheet which is described in Example 2.

An aqueous solution comprising 1 mole/liter $Na_2S$ and 2 moles/liter $Na_2CO_3$, as recovered from washing of an industrial gas containing $H_2S$ and $CO_2$ by means of an aqueous solution of sodium hydroxide and sodium carbonate, is fed, through line (2), to a reactor (1) provided with a stirrer and maintained at a temperature of about 45° C. An aqueous suspension of copper oxide, corresponding to 79.5 kg/hour of CuO and 16 kg/h of water, is also fed through duct (3).

The resulting mixture is withdrawn through duct 4 from the bottom of the reactor after a contact time of about ½ hour; it is then injected at a rate of 1.1 m³ into a wash tower (5) fed at its bottom, through duct 6, with 0.5 m³ of water per hour, thereby washing the muddy precipitate contained in the solution. 1.25 m³/hour of an aqueous solution of 0.8 mole/liter sodium hydroxide and 1.6 mole/liter sodium carbonate is collected through duct (7) at the top of the tower; this solution is recycled to a $H_2S$ and $CO_2$ absorption unit. During this step, excess water is carried along as vapor by the treated gas. The precipitate of CuS suspended in water is discharged through duct (8) from the bottom of the tower, at a rate of 345 liters/hour.

This suspension is supplied to a furnace (9) fed with fuel and air (ducts 10 and 11) where it forms a fluidized bed. The roasting temperature is maintained at about 800° C. and air is admixed in excess, so as to complete the calcination.

The products recovered from the roasting step are discharged through duct (12) from the top of the furnace and are passed in a cyclone (13) to be separated into a $SO_2$ containing gas, discharged through duct 14, and a solid product, consisting of copper oxide, which is fed through duct (15) to a drum (16) provided with a stirrer and fed with 16 liters/hour water recovered from duct (17). The resultant suspension is supplied through duct (3) to the reactor (1).

The gas discharged from duct (14) has a $SO_2$ content of 8% by volume, and the amount of $SO_2$ collected in one hour is about 1 kmole.

EXAMPLE 2 (FIG. 2)

A reactor (38) is fed through duct (18) with an aqueous solution of 4 moles/liter ammonium sulfide at a rate of 1m³/h. The solution is mechanically stirred with 318 kg/hour of CuO supplied from duct (19). The temperature in the reactor is about 20° C.

The resultant mixture is kept is contact for about ½ hour. Thd aqueous effluent stream contains ammonia, a soluble copper ammonia complex and a copper sulfide precipitate. This effluent stream is supplied through duct (20) to the drum filter (21). Additional water is supplied through duct (22) to wash the copper sulfide and remove ammonia therefrom before feeding it, through the screw conveyor (24) located on duct (23), to a burner (25) where it is calcined in the presence of air in excess (duct 26) at a temperature of about 800° C.

The roasting product is discharged through duct (31) from the furnace; it passes through a cyclone (32) to separate a $SO_2$ containing gas, which is discharged through duct (33) and a solid product, discharged through duct (34) essentially containing CuO and traces of $CuSO_4$ from which it is made free by water washing in a column (35) before being fed to reactor (30) through duct (19); water supplied through duct (36) is recovered from duct (37).

After filtration in unit (21) an ammonia solution is discharged, to which the precipitate rinse water is added; the solution is fed through duct (27) to a column (28), maintained at a temperature of 80° C., where a combustion gas is used to strip gaseous ammonia (8 kmoles/hour) and steam therefrom. The stripped material evolves through duct (29); it may be condensed to be used as absorbent for $H_2S$ contained in a gas.

The solution collected at the bottom of the column (28) through duct (30), containing copper oxide from the copper ammonia complex salt which has been decomposed into CuO and $NH_3$, is supplied through duct (22) to the filter (21) to be used as wash water for the precipitate on said filter.

The $SO_2$ product is about 4 kmoles/hour.

What we claim is:

1. A process for selectively desulfurizing a gas containing both hydrogen sulfide and carbon dioxide with sulfur dioxide production, which process comprises the steps of:
   (a) contacting said gas with an aqueous absorption solution of sodium hydroxide, potassium hydroxide or ammonia to absorb said hydrogen sulfide and said carbon dioxide as sodium sulfide, potassium sulfide or ammonium sulfide respectively and sodium carbonate, potassium carbonate or ammonium carbonate, respectively;
   (b) reacting resultant sulfide and carbonate-containing solution from step (a) with copper oxide to form a precipitate consisting essentially of copper sulfide, and to produce additional sodium hydroxide, potassium hydroxide or ammonia in the solution;
   (c) separating said precipitate consisting essentially of copper sulfide from resultant solution of step (b);
   (d) roasting separated copper sulfide precipitate from step (c) to convert said copper sulfide to copper oxide and sulfur dioxide, and separately recovering resultant copper oxide and a sulfur dioxide containing gas;
   (e) recycling resultant copper oxide from step (d) to step (b) as said copper oxide, and (f) recycling separated solution from step (c) to step (a) as said aqueous absorption solution.

2. A process according to claim 1, wherein copper oxide is utilized in the dry state.

3. A process according to claim 1, wherein copper oxide is utilized as a suspension in water.

4. A process according to claim 1, wherein the separated copper sulfide precipitate from step (c) is washed with water before said roasting of step (d).

5. A process according to claim 1, wherein the absorption solution of step (a) is an ammonia solution and the separated solution from step (c), which comprises both ammonia and a copper ammonia complex salt, is subjected to ammonia stripping conditions to seprately obtain gaseous ammonia and to decompose the copper ammonia complex salt to form an aqueous suspension of copper oxide, and recycling resultant gaseous ammonia to step (a).

6. A process according to claim 5, wherein said separated copper sulfide precipitate from step (c) is washed with said obtained aqueous suspension of copper oxide before said roasting of step (d).

7. A process according to claim 1, wherein the reacting conditions of step (b) comprise a temperature range of at least 0° C. to at most the boiling point of the resultant solution from step (a).

8. A process according to claim 1, wherein the reacting conditions of step (b) comprise a temperature of about 20°–60° C.

9. A process according to claim 1, wherein the roasting conditions of step (d) comprise a temperature of 600°–1100° C.

10. A process according to claim 1, wherein the roasting step (d) is conducted in two stages: first, at 100°–300° C. and then at 700°–900° C.

* * * * *